US010198332B2

(12) United States Patent
Kumar et al.

(10) Patent No.: US 10,198,332 B2
(45) Date of Patent: Feb. 5, 2019

(54) SYSTEM ON CHIP INTEGRITY VERIFICATION METHOD AND SYSTEM

(71) Applicant: Infineon Technologies AG, Neubiberg (DE)

(72) Inventors: Varun Kumar, Bangalore (IN); Sandeep Naduvalamane, Ballari (IN); Sumit Khandelwal, Bangalore (IN); Puneetha Mukherjee, Bangalore (IN); Juergen Schaefer, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 146 days.

(21) Appl. No.: 15/288,434

(22) Filed: Oct. 7, 2016

(65) Prior Publication Data

US 2018/0101458 A1 Apr. 12, 2018

(51) Int. Cl.

| | |
|---|---|
| ***G06F 11/00*** | (2006.01) |
| ***G06F 11/22*** | (2006.01) |
| ***G06F 9/4401*** | (2018.01) |
| ***G06F 9/445*** | (2018.01) |

(Continued)

(52) U.S. Cl.

CPC ........ *G06F 11/2289* (2013.01); *G06F 9/4411* (2013.01); *G06F 9/44505* (2013.01); *G06F 11/2236* (2013.01); *G06F 11/2284* (2013.01); *G06F 11/27* (2013.01); *G06F 15/781* (2013.01)

(58) Field of Classification Search

CPC ... G06F 11/27; G06F 11/2284; G06F 11/2236

See application file for complete search history.

(56) References Cited

U.S. PATENT DOCUMENTS

| | | | | |
|---|---|---|---|---|
| 9,767,319 | B2 * | 9/2017 | Chen | G06F 21/73 |
| 2008/0163143 | A1 * | 7/2008 | Kwon | G06F 17/5022 716/107 |

(Continued)

FOREIGN PATENT DOCUMENTS

| | | | |
|---|---|---|---|
| JP | H06-332744 | A | 12/1994 |
| JP | H07-28663 | A | 1/1995 |

(Continued)

OTHER PUBLICATIONS

Office Action dated Nov. 30, 2018 for Japanese Patent Application No. 2017-195727.

*Primary Examiner* — Charles Ehne

(74) *Attorney, Agent, or Firm* — Schiff Hardin LLP

(57) ABSTRACT

Methods and systems for checking the integrity of a system on chip (SOC) are described. The SOC can include a controller and one or more registers. Register value(s) from the register(s) can be obtained at a first time to generate a first set of register values. Process(es) of the SOC are executed at a second time after the first time. Register values can again be obtained from the registers at a third time after the second time to generate a second set of register values. The first set of register values can be compared with the second set of register values. Based on the comparison, an operating mode of the SOC can be adjusted. The SOC integrity verification system and method can be used in safety and/or monitoring application(s), such as ASIL applications. For example, the system and method can be used in partial or fully autonomous (self-driving) automotive systems.

20 Claims, 6 Drawing Sheets

(51) Int. Cl.

| | |
|---|---|
| ***G06F 11/27*** | (2006.01) |
| ***G06F 15/78*** | (2006.01) |

(56) References Cited

U.S. PATENT DOCUMENTS

| | | | | |
|---|---|---|---|---|
| 2013/0238933 | A1* | 9/2013 | Shin | G06F 11/27 714/30 |
| 2015/0269049 | A1* | 9/2015 | Rohleder | G06F 11/261 714/28 |
| 2016/0146888 | A1* | 5/2016 | Vooka | G06F 11/27 714/734 |
| 2016/0283313 | A1* | 9/2016 | Robertson | G06F 11/0793 |

FOREIGN PATENT DOCUMENTS

| | | | |
|---|---|---|---|
| JP | H08-95831 | A | 4/1996 |
| JP | 2012-147327 | A | 8/2012 |
| JP | 2014-115928 | A | 6/2014 |
| WO | 1997-038367 | A1 | 10/1997 |

* cited by examiner

SYSTEM ON CHIP INTEGRITY VERIFICATION METHOD AND SYSTEM

BACKGROUND

Field

Embodiments described herein generally relate to system integrity verification methods and devices, including integrity verifications during start-up and/or runtime.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

As an overview, during start-up (also referred to as boot-up) of a system on chip (SOC), such as a microcontroller, and before application software execution, start-up software is executed. The start-up software is generally related to hardware of an associated system, such as one or more peripheral devices connected with the microcontroller. Due to changes with the microcontroller state during the execution of the start-up software, later executed application software can be negative impacted. The changes of the microcontroller state can include, for example, changes with control and status registers of the microcontroller.

The status of the microcontroller can be verified against direct impact flags or registers. In one or more exemplary embodiments, indirect impacts can be verified by checking one or more registers, such as special function registers (SFR), and in some or all embodiments, all SFRs are checked. For example, the SFRs can be checked to verify that the SFRs have been restored to their corresponding expected values to reduce and/or prevent application issues with later executed application software. In operation, the SFRs can be associated with one or more peripheral devices connected with (and controlled by) the SOC (e.g., microcontroller). The SFRs can be used to configure the associated peripheral devices. For example, a SFR can be configured to define the data rate for communications between the SOC and the corresponding peripheral device. The verification of the SFRs can be in addition to, or as an alternative to one or more memory built-in self-tests (MBIST) and/or logic built-in self-tests (LBIST). Further, the integrity of the SFRs can be used to support the verification of, for example, automotive safety integrity level (ASIL) applications.

Figure 1:
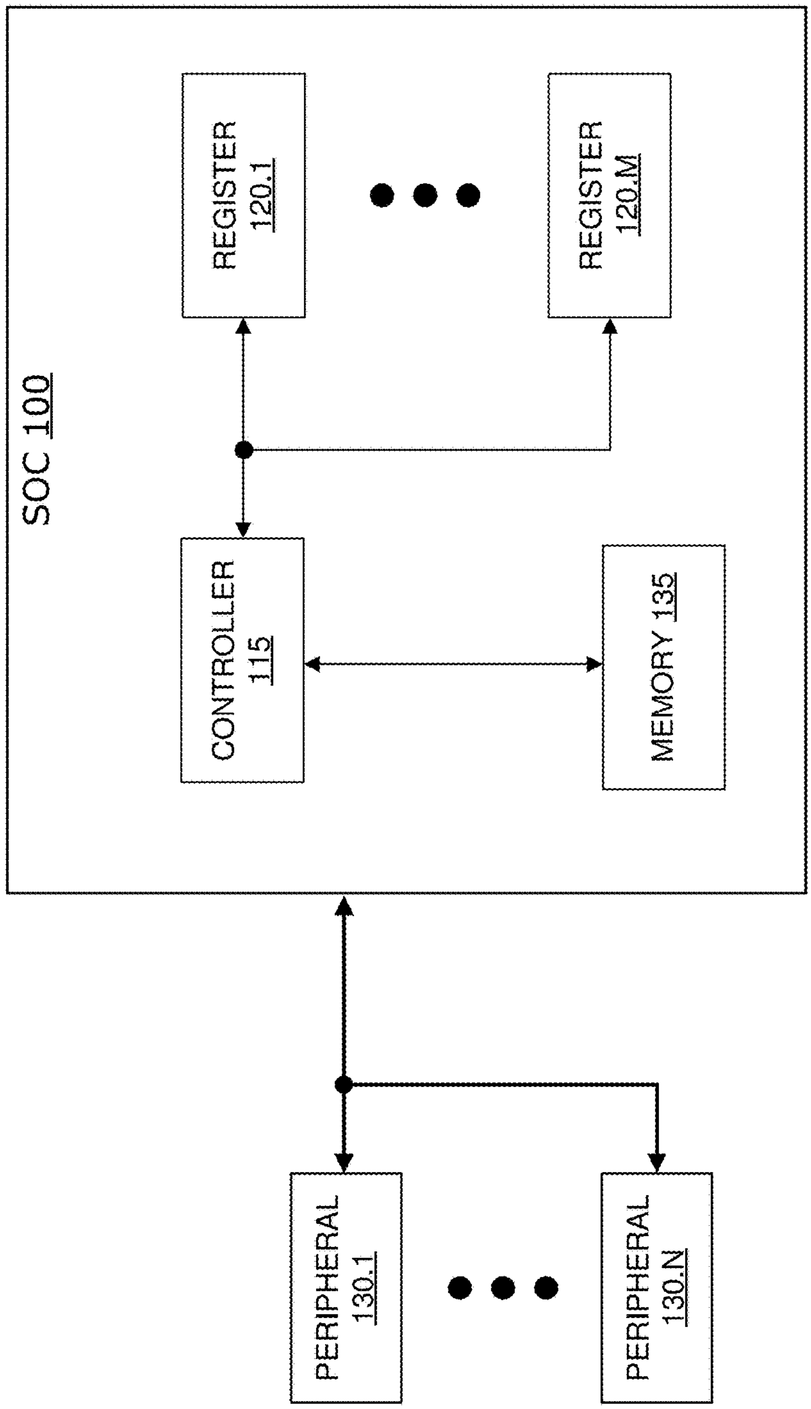
FIG. 1 illustrates a system on chip (SOC) according to an exemplary embodiment of the present disclosure.

FIG. 1 illustrates a system on chip (SOC) 100 according to an exemplary embodiment of the present disclosure. The SOC 100 can include a controller 115, one or more memory units 135, and one or more registers 120.1 to 120.M. The SOC 100 can be connected with one or more peripheral devices 130.1 to 130.N. In an exemplary embodiment, the SOC 100 is a microcontroller, but is not limited thereto. The memory 135 can be any well-known volatile and/or non-volatile memory that stores data and/or instructions, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both. Although not illustrated, in one or more exemplary embodiments, the SOC 100 can include one or more (internal) peripheral devices within the SOC 100 in addition or as an alternative to the peripherals 130.1 to 130.N.

In an exemplary embodiment, the one or more of the registers 120 is a special function register (SFR). One or more of the registers 120 can be associated with a corresponding one of the peripheral devices 130, and the registers 120 can be configured to define one or more parameters of the corresponding peripheral devices 130. For example, the register value of register 120.1 can define a data rate between the SOC 100 and the peripheral device 130. In another example, the register value of register 120.1 can define, for example, the peripheral name, serial number, hardware version, software version, firmware version, and/or one or more other parameters as would be understood by one of ordinary skill in the relevant arts. In an exemplary embodiment where the SOC 100 includes one or more internal peripherals, the SOC 100 can include one or more corresponding registers 120 associated with the internal peripherals.

In an exemplary embodiment, the controller 115 can be configured to perform one or more integrity verification operations to check the integrity of the SOC 100. In an exemplary embodiment, the controller 115 can include processor circuitry that is configured to perform the one or more integrity verification operations to check the integrity of the SOC 100.

The controller 115 can be configured to perform the integrity verification operation(s) during start-up and/or runtime of the SOC 100. For example, the controller 115 can check the integrity of the SOC 100 during start-up (also referred to as boot-up) of the SOC 100 and before application software execution. In an exemplary embodiment, the controller 115 can be configured to check the integrity of the SOC 110 after start-up software has been executed but before the execution of software applications. In operation, the controller 115 can be configured to determine state changes of the SOC 100 during (and resulting from) the execution of the start-up software. The changes of the state of the SOC 100 can include, for example, changes with control and status registers of the SOC 100. By determining state changes of the SOC 100, possible negative implications on later executed application software from the SOC 100 state changes can be reduced and/or negated.

In an exemplary embodiment, the controller 115 can be configured to obtain corresponding register values from one or more of the registers 120.1 to 120.N. The controller 115 can read the register values from the registers 120 and store the register values in one or more memories 135 of the SOC 100. In some embodiments, the controller 115 includes one or more internal memories and can be configured to store the register values in the one or more internal memories in addition to, or as an alternative to, the memory 135.

In an exemplary aspect, the controller 115 can obtain the register values before the execution of one or more start-up operations of the SOC 100, including one or more start-up applications. In this example, these register values can be referred to as pre-execution register values. In the present disclosure, applications can include a computer program having one or more instructions that, when executed by a corresponding controller 115, controls the controller 115 to perform one or more functions of the corresponding application.

In an exemplary embodiment, the controller 115 can be configured to generate one or more sets of register values based on one or more of the obtained register values. The set(s) of register values can be then stored in the memory 135 and/or an internal memory (or memories) of the controller 115.

Following the acquisition of the register values (or the generation of the set(s) of register values from the obtained values), the controller 115 can execute one or more processes of the SOC 100, which can include one or more start-up operations of the SOC 100 (e.g., execution of the start-up software). The controller 115 can be "hard-coded" with instructions to perform corresponding start-up functions, or can be configured to access an internal memory of the controller 114 and/or memory 135 to retrieve instructions stored therein, which when executed by the controller 115, perform the corresponding start-up functions.

The controller 115 can also be configured to again obtain corresponding register values from one or more of the registers 120.1 to 120.N. The controller 115 can read the register values from the registers 120 and store the register values in one or more memories 135 of the SOC 100 and/or an internal memory of the controller 115. In an exemplary aspect, the controller 115 can obtain the register values after the execution of one or more start-up operations of the SOC 100, including one or more start-up applications. In this example, these register values can be referred to as post-execution register values.

In an exemplary embodiment, the controller 115 can be configured to generate one or more additional sets of register values based on the post-execution register values. The set(s) of register values can be then stored in the memory 135 and/or an internal memory (or memories) of the controller 115. In this example, this set of register values can be referred to as post-execution register value set(s).

In an exemplary embodiment, the controller 115 can be configured to compare the pre-execution register values/sets with the post-execution register values/sets. For example, the controller 115 can be configured to compare the pre-execution register values/sets with the post-execution register values/sets. Based on the comparison, the controller 115 can be configured to determine differences between the pre-execution and post-execution register values/sets.

In an exemplary embodiment, the controller 115 can be configured to analyze the differences between the pre-execution and post-execution register values/sets and determine if the controller 115 should take one or more actions. The actions can include, for example, changing the operating mode of the SOC 100 (e.g., switch to a safe mode), perform a reset of the SOC 100 (e.g., power-on reset), restore one or more registers 120 to a predetermined value (e.g., a default value), generate a warning of the difference that may impact operation of the SOC 100, and/or one or more other actions as would be understood by one of ordinary skill in the art.

The controller 115 can be configured to generate, or control the SOC 100 to generate, one or more one or more databases based on the pre-execution and post-execution register values/sets and the determination of any differences between the values/sets. The database can include, for example, register names, register addresses (e.g., 0xf0000000), pre-execution register values, post-execution values, one or more indicators/flags indicating a difference between the pre-execution and post-execution values, analysis by the controller 115 and/or by one or more users of the SOC 100, the action(s) taken or to be taken by the controller 115 and/or by the user(s) of the SOC 100, and/or one or more other parameters and/or information as would be understood by one of ordinary skill in the relevant arts. The database can be stored in one or memory units, such as memory 135.

In an exemplary embodiment, the controller 115 can be configured to generate a report based on the comparison of the pre-execution and post-execution register values/sets. The report can include the analysis of the pre-execution and post-execution register values/sets and/or the action(s) taken or to be taken by the controller 115. The controller 115 can be configured to provide, or control the SOC 100 to provide the generated report to one or more components of the SOC 100, provide the report to one or more external devices (e.g., peripheral devices 130), transmit the report via one or more communication networks, control the SOC 100 to display the report on one or more displays, and/or take one or more other actions with the generated report as would be understood by one of ordinary skill in the relevant arts.

In an exemplary embodiment, the controller 115 can be configured to generate a notification, or control the SOC 100 and/or one or more external components to generate the notification, to indicate differences between the pre-execution and post-execution values. The notification can include a signal to one or more other components to notify the component(s) of the difference, an audible signal, a visual signal, or another notification as would be understood by one of ordinary skill in the relevant arts. In an exemplary embodiment, the controller 115 can be configured to notify (and/or control the SOC 100 and/or one or more external components to notify) application software of the SOC 100 and/or application software of one or more one or more external components based on one or more differences between the pre-execution and post-execution values.

Figure 2:
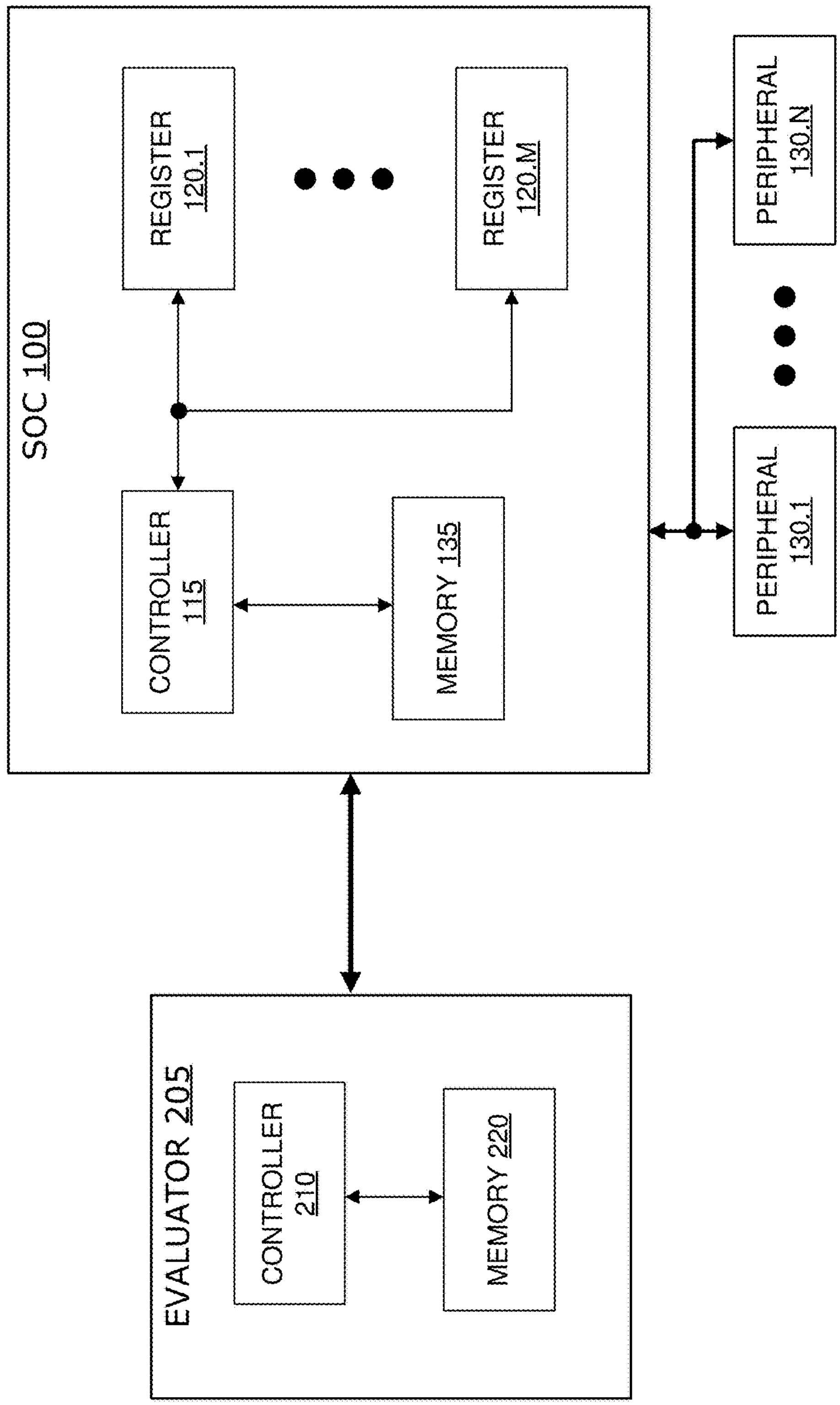
FIG. 2 illustrates SOC integrity verification system according to exemplary embodiments of the present disclosure.

FIG. 2 illustrates a system on chip (SOC) integrity verification system 200 according to an exemplary embodiment of the present disclosure. The SOC integrity verification system 200 can include the SOC 100 that can be configured to connect with one or more peripheral devices 130 similar to the exemplary embodiments discussed with reference to FIG. 1. In an exemplary embodiment, the evaluator 205 is implemented as, for example, a processing device (e.g., processor) or a computer (such as computer system 600 described with reference to FIG. 6), but is not limited thereto.

In an exemplary embodiment, the SOC integrity verification system 200 includes the evaluator 205 that is connected (wireless and/or wired) to the SOC 100. The evaluator 205 can include a controller 210 and memory 220 that is connected to the controller 210. The memory 220 can be any well-known volatile and/or non-volatile memory that stores data and/or instructions, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

In an exemplary embodiment, the controller 210 can be configured to perform one or more integrity verification operations to check the integrity of the SOC 100. In an exemplary embodiment, the controller 210 can include processor circuitry that is configured to perform the one or more integrity verification operations to check the integrity of the SOC 100.

As discussed above with reference to FIG. 1, the controller 115 can be configured to obtain corresponding register values from one or more of the registers 120.1 to 120.N. The controller 115 can read the register values from the registers 120 and store the register values in one or more memories 135 of the SOC 100 and/or in one or more internal memories of the controller 115. In an exemplary aspect, the controller 115 can obtain the register values (e.g., pre-execution register values) before the execution of one or more start-up operations of the SOC 100, including one or more start-up applications. The controller 115 can generate one or more sets of register values based on one or more of the obtained register values.

Following the acquisition of the register values (or the generation of the set(s) of register values from the obtained values), the controller 115 can execute one or more processes of the SOC 100, which can include one or more start-up operations of the SOC 100 (e.g., execution of the start-up software). The controller 115 can again obtain (and store) corresponding register values from one or more of the registers 120.1 to 120.N (e.g., post-execution register values). The controller 115 can be configured to generate (and store) one or more additional sets of register values based on one or more of the obtained register values (e.g., post-execution register value set(s)). In an exemplary embodiment, the controller 210 of the evaluator 205 is configured to control the controller 115 to obtain register values, and/or execute one or more processes of the SOC 100.

In an exemplary embodiment, the controller 115 can be configured to provide the pre-execution and post-execution register values and/or register value sets to the evaluator 205. In an exemplary embodiment, the evaluator 205 can obtain/read the values/value sets from the SOC 100. The evaluator 205 can store the values or value sets in memory 220 and/or in one or more internal memories of controller 210. In an exemplary embodiment, the connection between the SOC 100 and the evaluator 205 is a serial connection, a Universal Serial Bus (USB) connection, infrared connection, fiber optic connections, firewire (IEEE 1394), eSATA connection, wired and/or wireless network connection (e.g., WLAN, LAN, Ethernet), and/or another connection type as would be understood by one of ordinary skill in the relevant arts.

In an exemplary embodiment, the controller 210 can be configured to compare the pre-execution register values with the post-execution register values. For example, the controller 210 can be configured to compare the pre-execution register value set(s) with the post-execution register value set(s). Based on the comparison, the controller 210 can be configured to determine differences between the pre-execution and post-execution register values/sets.

In an exemplary embodiment, the controller 210 can be configured to analyze the differences between the pre-execution and post-execution register values/sets and determine if the controller 115 and/or the controller 210 should take one or more actions. The actions can include, for example, changing the operating mode of the SOC 100 (e.g., switch to a safe mode), perform a reset of the SOC 100 (e.g., power-on reset), restore one or more registers 120 to a predetermined value (e.g., a default value), generate a warning of the difference that may impact operation of the SOC 100, and/or one or more other actions as would be understood by one of ordinary skill in the art.

The controller 210 can be configured to generate, or control the SOC 100 (e.g., controller 115) to generate, one or more one or more databases based on the pre-execution and post-execution register values/sets and the determination of any differences between the values/sets. As discussed above, the database can include, for example, register names, register addresses (e.g., 0xf0000000), pre-execution register values, post-execution values, one or more indicators/flags indicating a difference between the pre-execution and post-execution values, analysis by the controller 210, controller 115, and/or by one or more users of the SOC 100, the action(s) taken or to be taken by the controller 210, the controller 115 and/or by the user(s) of the SOC 100, and/or one or more other parameters and/or information as would be understood by one of ordinary skill in the relevant arts. The database can be stored in one or memory units, such as memory 220 and/or memory 135.

In an exemplary embodiment, the controller 210 can be configured to generate a report based on the comparison of the pre-execution and post-execution register values/sets. The report can include the analysis of the pre-execution and post-execution register values/sets and/or the action(s) taken or to be taken by the controller 210 and/or controller 115. The controller 210 can be configured to provide, or control the SOC 100 to provide the generated report to one or more components of the SOC 100, provide the report to one or more external devices (e.g., peripheral devices 130), transmit the report via one or more communication networks, display the report on one or more displays, control the SOC 100 to display the report on one or more displays, and/or take one or more other actions with the generated report as would be understood by one of ordinary skill in the relevant arts.

In an exemplary embodiment, the controller 210 can be configured to generate a notification, or control the SOC 100 and/or one or more external components to generate the notification, to indicate differences between the pre-execution and post-execution values. The notification can include a signal to one or more other components to notify the component(s) of the difference, an audible signal, a visual signal, or another notification as would be understood by one of ordinary skill in the relevant arts.

In an exemplary embodiment, the controller 210 and the controller 115 can cooperatively operate to perform one or more integrity verification operations. In this example, any combination of the functions and operations performed by the controller 115 can be performed by the controller 210, and vice versa. For example, the controller 115 can perform a portion of the obtaining of values, storing of values, comparing values, analyzing values, database generation, notification, and/or reporting, while the controller 210 performs the remaining portion of the operations not performed by the controller 115.

Figure 3:
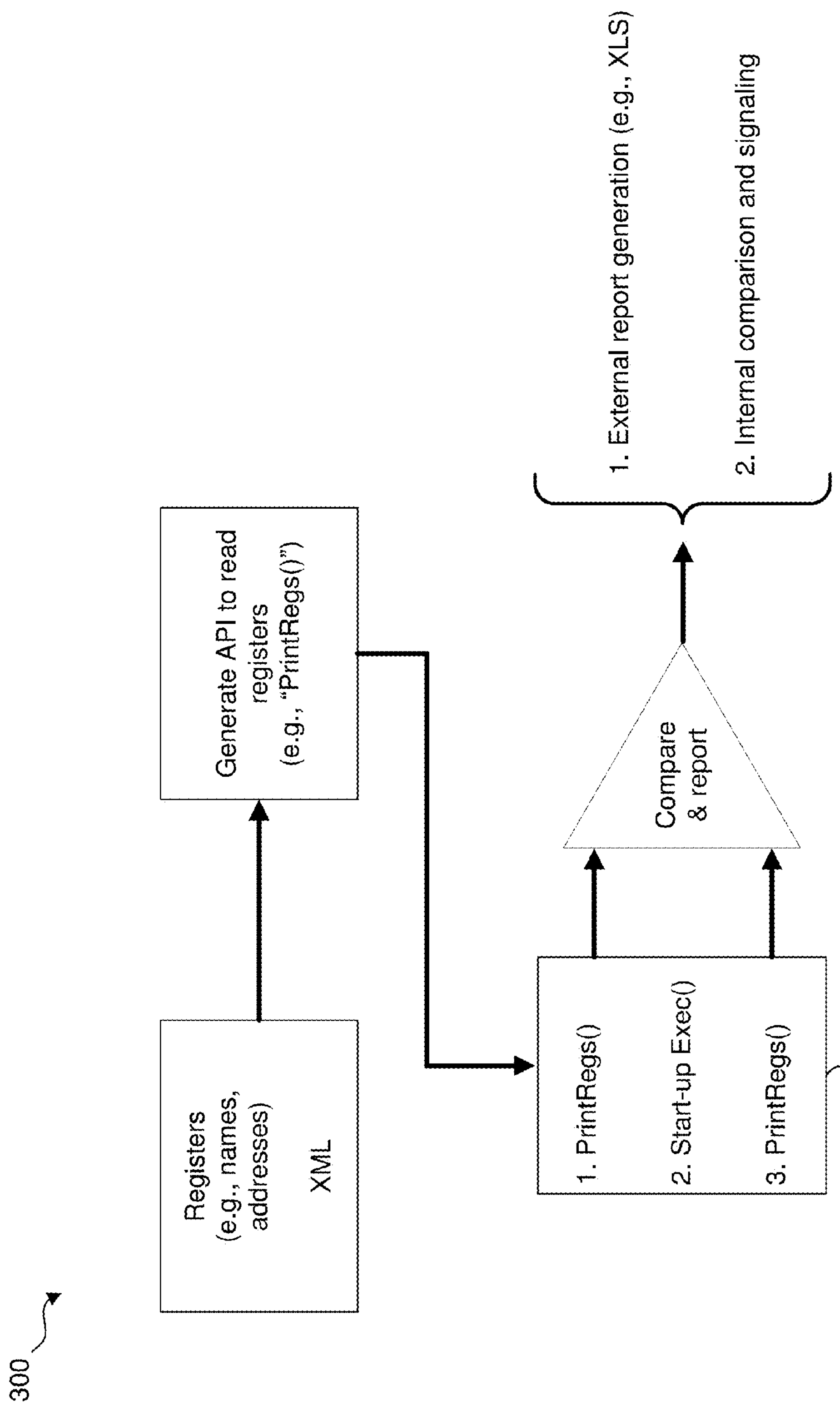
FIG. 3 illustrates an example operation of a SOC integrity verification system according to an exemplary embodiment of the present disclosure.

FIG. 3 illustrates an example operation 300 of a SOC integrity verification system according to an exemplary embodiment of the present disclosure. The operation 300 is described with reference to FIGS. 1 and 2.

In an exemplary embodiment, one or more registers (e.g., registers 120) can be identified (e.g., names, addresses, and/or other identification information). The identification information of the register(s) can be used with one or more software applications configured to read register values from the registers. For example, an application programming interface (API) can be used to create one or more software applications configured to obtain register values (e.g., "PrintRegs( )" instruction) from one or more registers. The reading operations (e.g., "PrintRegs( )" instruction) can be implemented in the SOC 100 and the controller 115 can be configured to execute the instruction to read the register values from the registers 120. In operation, the controller of the SOC 100 can be configured to obtain the register values before the execution of one or more start-up operations (e.g., "Start-up Exec( )" instruction) of the SOC 100.

Following the acquisition of the pre-execution register values/sets, the controller 115 can execute one or more start-up operations (e.g., "Start-up Exec( )" instruction). After the start-up operation(s) have been executed (and in some embodiments, after the operations have completed), the controller 115 can again read register values from the registers (e.g., "PrintRegs( )" instruction).

The pre-execution and post-execution register values/sets can then be compared and analyzed. In an exemplary embodiment, the controller 115 can be configured to compare the pre-execution register values with the post-execution register values. Based on the comparison, the controller 115 can be configured to determine differences between the pre-execution and post-execution register values/sets.

In an exemplary embodiment, the controller 115 can be configured to analyze the differences between the pre-execution and post-execution register values/sets and determine if the controller 115 should take one or more actions.

In an exemplary embodiment, a report can be generated based on the comparison of the pre-execution and post-execution register values/sets. For example, the controller 115 can be configured to generate a report based on the comparison of the pre-execution and post-execution register values/sets. The report can include the analysis of the pre-execution and post-execution register values/sets and/or action(s) taken or to be taken by the controller 115. The controller 115 can be configured to provide, or control the SOC 100 to provide the generated report to one or more components of the SOC 100, provide the report to one or more external devices (e.g., peripheral devices 130), transmit the report via one or more communication networks, control the SOC 100 to display the report on one or more displays, and/or take one or more other actions with the generated report as would be understood by one of ordinary skill in the relevant arts.

The pre-execution and post-execution register values/sets, corresponding analysis, determined differences and/or other information can be stored in the SOC 100 and/or in one or more external devices. For example, the controller 115 can be configured to store the pre-execution and post-execution register values/sets, corresponding analysis, and the determination of any differences between the values/sets in, for example, memory 135. The controller 115 can be configured to generate, or control the SOC 100 to generate, one or more one or more databases based on the pre-execution and post-execution register values/sets and the determination of any differences between the values/sets.

Additionally or alternatively, the comparison of the pre-execution and post-execution register values/sets, analysis, differences determination, report generation, notifications, and/or other operations can be performed by an external device such as evaluator 205 as illustrated in FIG. 2. These external operations are described in more detail with reference to FIG. 4.

Figure 4:
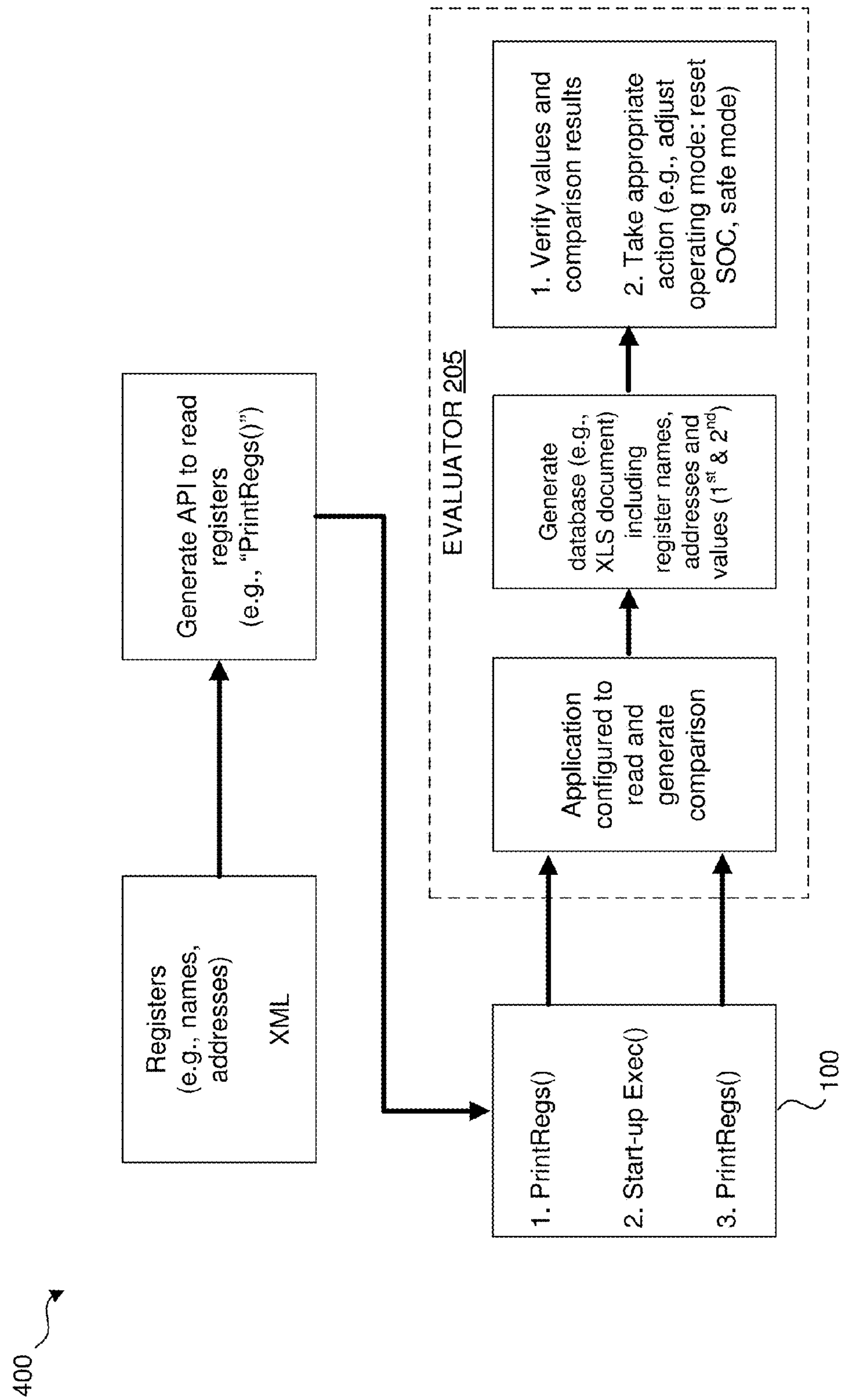
FIG. 4 illustrates an example operation of a SOC integrity verification system according to an exemplary embodiment of the present disclosure.

FIG. 4 illustrates an example operation 400 of a SOC integrity verification system according to an exemplary embodiment of the present disclosure. The operation 400 is similar to the operation 300 illustrated in FIG. 3 but includes operations being performed by an external component, such as evaluator 205.

For example, as discussed above, one or more registers (e.g., registers 120) can be identified, and the identification information can be used with one or more software applications configured to read register values from the registers. The reading operations (e.g., "PrintRegs( )" instruction) can be implemented in the SOC 100 and the controller 115 can be configured to execute the instruction to read the register values from the registers 120. In operation, the controller of the SOC 100 can be configured to obtain the register values before the execution of one or more start-up operations (e.g., "Start-up Exec( )" instruction) of the SOC 100.

Following the acquisition of the pre-execution register values/sets, the controller 115 can execute one or more start-up operations (e.g., "Start-up Exec( )" instruction). After the start-up operation(s) have been executed (and in some embodiments, after the operations have completed), the controller 115 can again read register values from the registers (e.g., "PrintRegs( )" instruction).

The pre-execution and post-execution register values/sets are then provided to the evaluator 205 or obtained from the SOC 100 by the evaluator 205.

In an exemplary embodiment, the evaluator 205 can receive and/or obtain/read the values/value sets from the SOC 100. The evaluator 205 can store the values or value sets in memory 220 and/or in one or more internal memories of controller 210.

The pre-execution and post-execution register values/sets are then compared. Based on the comparison, differences between the pre-execution and post-execution register values/sets can be determined. In an exemplary embodiment, the controller 210 of the evaluator 205 can be configured to compare the pre-execution register values with the post-execution register values. Based on the comparison, the controller 210 can be configured to determine differences between the pre-execution and post-execution register values/sets.

The pre-execution and post-execution register values/sets and/or any determined differences can be analyzed. Based on the analysis, the evaluator 205 can determine if one or more actions (e.g., adjust operating mode, reset SOC 100, etc.) are to be taken. In an exemplary embodiment, the controller 210 can be configured to analyze the differences between the pre-execution and post-execution register values/sets and determine if the controller 115 and/or the controller 210 should take one or more actions.

In an exemplary operation, one or more databases can be generated. For example, the controller 210 can be configured to generate, or control the SOC 100 (e.g., controller 115) to generate, one or more one or more databases based on the pre-execution and post-execution register values/sets and the determination of any differences between the values/sets. In a non-limiting example, the database can be a table of values, a spreadsheet (e.g., XLS document), or other data structure as would be understood by one of ordinary skill in the art.

As discussed above, the database can include, for example, register names, register addresses (e.g., 0xf0000000), pre-execution register values, post-execution values, one or more indicators/flags indicating a difference between the pre-execution and post-execution values, analysis by the controller 210, controller 115, and/or by one or more users of the SOC 100, the action(s) taken or to be taken by the controller 210, the controller 115 and/or by the user(s) of the SOC 100, and/or one or more other parameters and/or information as would be understood by one of ordinary skill in the relevant arts. The database can be stored in one or memory units, such as memory 220 and/or memory 135.

With continued reference to FIG. 4, a report can be generated based on the pre-execution values/sets, post-execution register values/sets, determined differences, analysis of the pre-execution and post-execution register values/sets, actions taken or to be taken by the SOC 100 and/or the evaluator 205, and/or other information as would be understood by one of ordinary skill in the relevant arts.

In an exemplary embodiment, the controller 210 can be configured to generate the report. The controller 210 can be configured to provide the report to one or more components of the SOC 100, provide the report to one or more external devices (e.g., peripheral devices 130), transmit the report via one or more communication networks, display the report on one or more displays, control the SOC 100 to display the report on one or more displays, and/or take one or more other actions with the generated report as would be understood by one of ordinary skill in the relevant arts.

In an exemplary embodiment, the controller 210 can be configured to generate a notification, or control the SOC 100 and/or one or more external components to generate the notification, to indicate differences between the pre-execution and post-execution values. The notification can include a signal to one or more other components to notify the component(s) of the difference, an audible signal, a visual signal, or another notification as would be understood by one of ordinary skill in the relevant arts.

Figure 5:
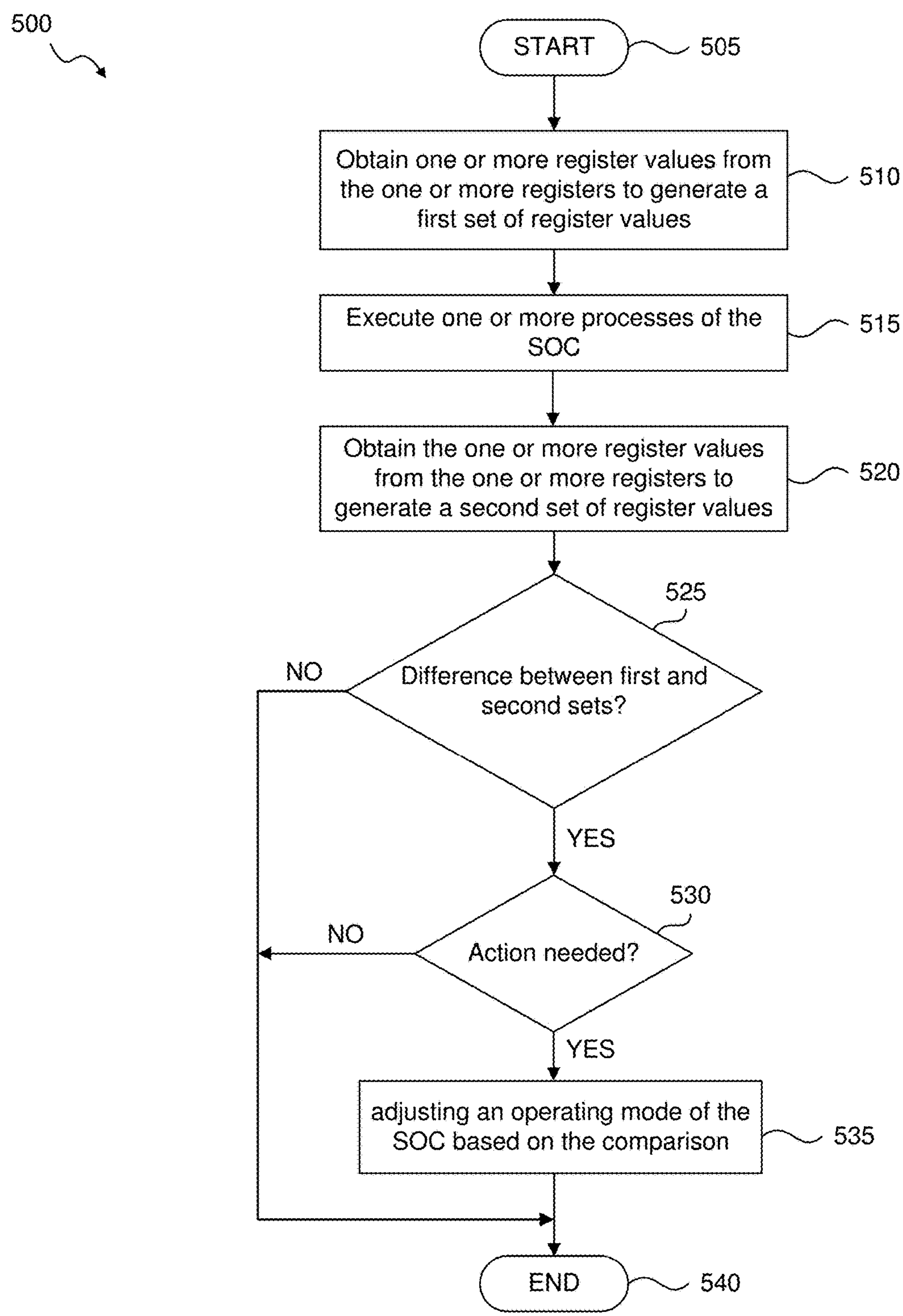
FIG. 5 illustrates a flowchart of an integrity verification method according to an exemplary embodiment of the present disclosure.

FIG. 5 illustrates a flowchart 500 of an integrity verification method according to an exemplary embodiment of the present disclosure. The flowchart is described with continued reference to FIGS. 1-4. The steps of the method are not limited to the order described below, and the various steps may be performed in a different order. Further, two or more steps of the method may be performed simultaneously with each other.

The method of flowchart 500 begins at step 505 and transitions to step 510, where one or more register values are obtained/read from the one or more registers to generate a first set of register values. In an exemplary embodiment, the SOC 100 (e.g., controller 115) is configured to obtain/read the register values from one or more of the registers 120. In an exemplary embodiment, the evaluator 205 is configured to control the SOC 100 to obtain/read the register values from the register(s) 120. In an exemplary embodiment, the SOC 100 can be configured generate a first register value set based on the obtained register values. The values and/or value sets can be stored in, for example, memory 135 and/or memory 220.

After step 510, the flowchart 500 transitions to step 515, where one or more processes, such as one or more start-up processes are executed. In an exemplary embodiment, the controller 115 of the SOC 100 is configured to execute, or control one or more other components of the SOC 100 to execute, one or more processes, which can include one or more start-up operations of the SOC 100.

After step 515, the flowchart 500 transitions to step 520, where one or more register values are again obtained/read from the one or more registers to generate a second set of register values. In an exemplary embodiment, the SOC 100 (e.g., controller 115) is configured to obtain/read the register values from one or more of the registers 120. In an exemplary embodiment, the evaluator 205 is configured to control the SOC 100 to obtain/read the register values from the register(s) 120. In an exemplary embodiment, the SOC 100 can be configured generate a second register value set based on the obtained register values. The values and/or value sets can be stored in, for example, memory 135 and/or memory 220.

After step 520, the flowchart 500 transitions to step 525, where the first set of register values and the second set of register values compared to determine if there is a difference between one or more of the register values between the first and the second sets of register values. In an exemplary embodiment, the controller 115 of the SOC 100 and/or the controller 210 of the evaluator 205 is configured to compare the first set of register values with the second set of register values.

If there is a difference with one or more values (YES at step 525), the flowchart 500 transitions to step 530. Otherwise (NO at step 525), the flowchart 500 transitions to step 540 where the flowchart ends.

At step 530, the differences between the first and the second sets of register values are analyzed. Based on the analysis, it is determined if one or more action should be performed in response to the differences. In an exemplary embodiment, the controller 115 of the SOC 100 and/or the controller 210 of the evaluator 205 is configured to analyze the differences between the first set of register values and the second set of register values. The controller 115 and/or controller 210 determine if one or more action should be taken based on the analysis. In an exemplary embodiment, the user of the SOC 100 can be configured to analyze the differences and determine if one or more actions should be taken. For example, the user can analyze a report generating based on the differences and determine if one or more actions should be taken.

If one or more action is to be performed (YES at step 530), the flowchart 500 transitions to step 535. Otherwise (NO at step 530), the flowchart 500 transitions to step 540 where the flowchart ends.

At step 535, one or more actions are performed in response to the analysis of the differences between the first and the second sets of register values. The actions can include, for example, changing/adjusting the operating mode of the SOC 100 (e.g., switch to a safe mode), perform a reset of the SOC 100 (e.g., power-on reset), restore one or more registers 120 to a predetermined value (e.g., a default value), generate a warning of the difference that may impact operation of the SOC 100, and/or one or more other actions as would be understood by one of ordinary skill in the art. In an exemplary embodiment, the controller 115 of the SOC 100 and/or the controller 210 of the evaluator 205 is configured to perform the action(s) or control the SOC 100 to perform the action(s).

After steps 535, the flowchart 500 transitions to step 540, where the flowchart 500 ends. The flowchart 500 may be repeated one or more times. For example, the flowchart 500 may be performed during the runtime of the SOC 100. As a non-limiting example, the integrity verification method can be performed during runtime: in response to a request from one or more external components; in response to an external component connecting with and/or disconnecting from, the SOC 100; in response to a user request; and/or at a specific time and/or periodically.

Example Computer System

Figure 6:
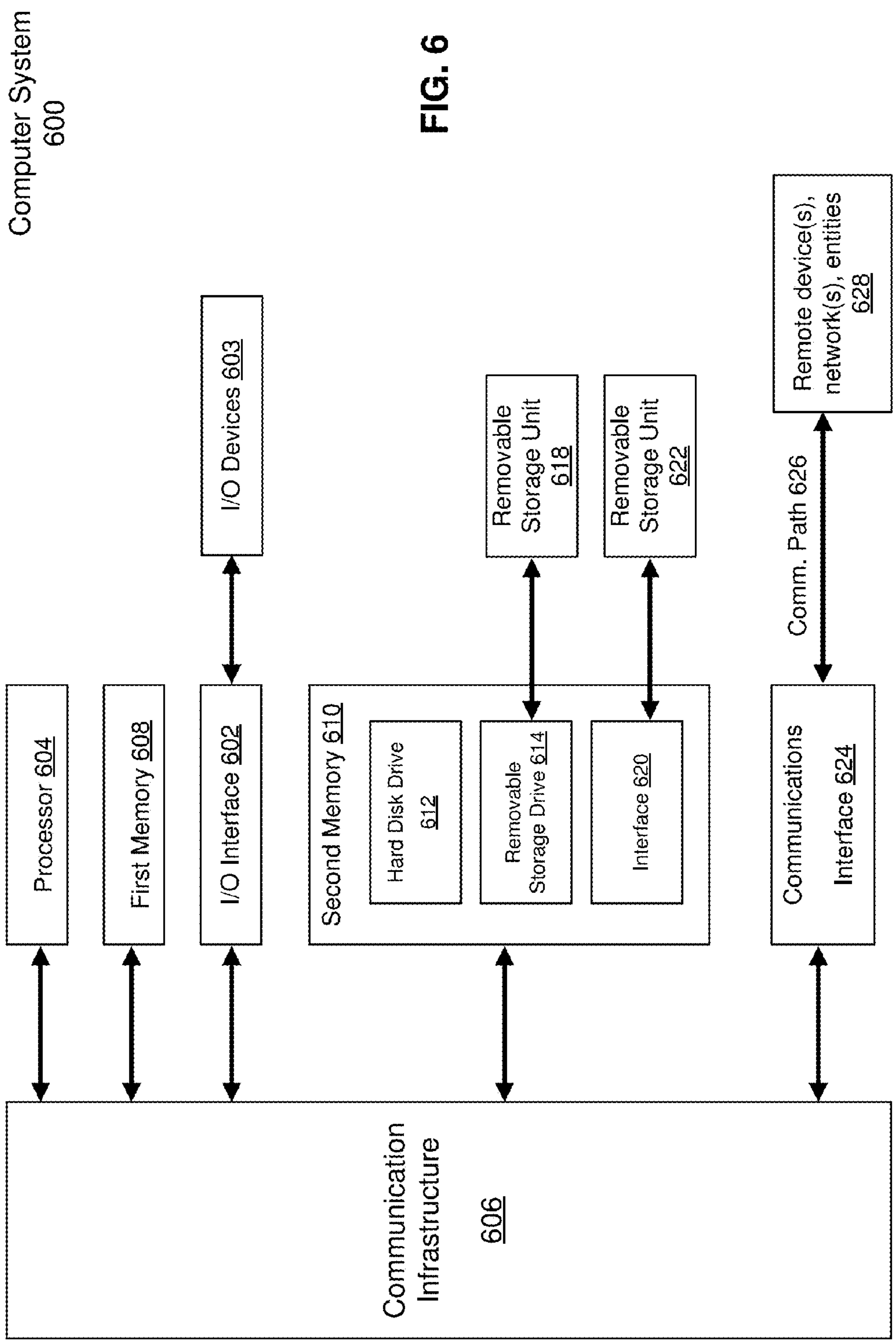
FIG. 6 illustrates an example computer system according to an exemplary embodiment of the present disclosure.

Various exemplary embodiments described herein can be implemented, for example, using one or more computer systems, such as computer system 600 shown in FIG. 6. Computer system 600 can be a computer capable of performing the functions described herein. In an exemplary embodiment, the evaluator 205 is implemented as the computer system 600.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 can also include user input/output device(s) 603, such as monitors, keyboards, pointing devices, etc., which communicate with communication infrastructure 606 through user input/output interface(s) 602.

Computer system 600 can include a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other instrumentalities or other approaches for allowing computer programs and/or other instructions and/or data to be accessed by computer system 600. Such instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an exemplary embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 6. In particular, embodiments may operate with software, hardware, and/or operating system implementations other than those described herein.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A method for checking the integrity of a system on chip (SOC) having a controller and one or more registers, the method comprising:

obtaining one or more register values from the one or more registers at a first time prior to execution of one or more startup operations of the SOC to generate a first set of register values;

executing, by the controller, the one or more startup operations of the SOC at a second time after the first time;

obtaining the one or more register values from the one or more registers at a third time after the second time to generate a second set of register values;

comparing the first set of register values with the second set of register values; and adjusting an operating mode of the SOC based on the comparison of the first and the second sets of register values.

2. The method of claim 1, further comprising:

generating a database based on the first set of register values, the second set of register values, and the comparison of the first and the second sets of register values.

3. The method of claim 1, further comprising:

automatically restoring the one or more register values of the one or more registers to corresponding one or more predetermined values based on the comparison of the first and the second sets of register values.

4. The method of claim 1, further comprising:

generating a report based on the comparison of the first and the second sets of register values and the adjustment of the operating mode; and providing the report to the SOC or to one or more peripheral devices in communication with the SOC.

5. The method of claim 1, wherein the one or more registers is a special function register.

6. The method of claim 1, wherein the one or more registers values are associated with one or more peripheral devices in communication with the SOC.

7. The method of claim 1, wherein the adjusting the operating mode of the SOC comprises:

setting the operating mode of the SOC to a safe mode, or resetting the SOC.

8. The method of claim 1, wherein the third time is during normal operation of the SOC.

9. The method of claim 1, wherein the one or more startup operations of the SOC are executed prior to application software execution.

10. The method of claim 1, wherein the one or more startup operations comprise one or more startup applications.

11. A system on chip (SOC), comprising:

one or more registers configured to store one or more register values; and a controller configured to:

obtain the one or more register values from the one or more registers at a first time prior to execution of one or more startup operations of the SOC to generate a first set of register values;

execute the one or more startup operations of the SOC at a second time after the first time;

obtain the one or more register values from the one or more registers at a third time after the second time to generate a second set of register values;

compare the first sot of register values with the second set of register values; and adjust an operating mode of the SOC based on the comparison of the first and the second sets of register values.

12. The SOC of claim 11, wherein the controller is further configured to:

generate a database based on the first set of register values, the second set of register values, and the comparison of the first and the second sets of register values.

13. The SOC of claim 11, wherein the controller is further configured to:

automatically restore the one or more register values of the one or more registers to corresponding one or more predetermined values based on the comparison of the first and the second sets of register values.

14. The SOC of claim 11, wherein the controller is further configured to:

generate a report based on the comparison of the first and the second sets of register values and the adjustment of the operating mode; and provide the report to one or more peripheral devices in communication with the SOC.

15. The SOC of claim 11, wherein the one or more registers is a special function register.

16. The SOC of claim 11, wherein the one or more registers values are associated with one or more peripheral devices in communication with the SOC.

17. The SOC of claim 11, wherein the adjusting the operating mode of the SOC comprises:

setting the operating mode of the SOC to a safe mode, or resetting the SOC.

18. The SOC of claim 11, wherein the third time is during normal operation of the SOC.

19. An integrity checking system, comprising:

a system on chip (SOC) including:

one or more registers configured to store one or more register values; and a controller configured to:

obtain the one or more register values from the one or more registers at a first time prior to execution of one or more startup operations of the SOC to generate a first set of register values;

execute the one or more startup operations of the SOC at a second time after the first time;

obtain the one or more register values from the one or more registers at a third time after the second time to generate a second set of register values; and an evaluator that is configured to:

receive the first and the second sets of register values from the SOC;

compare the first set of register values with the second set of register values; and instruct the SOC to adjust an operating mode of the SOC based on the comparison of the first and the second sets of register values.

20. The integrity checking system of claim 19, wherein the evaluator is further configured to:

generate a report based on the comparison of the first and the second sets of register values and the adjustment of the operating mode; and provide the report to one or more peripheral devices in communication with the SOC.

* * * * *

UNITED STATES PATENT AND TRADEMARK OFFICE

CERTIFICATE OF CORRECTION

PATENT NO. : 10,198,332 B2
APPLICATION NO. : 15/288434
DATED : February 5, 2019
INVENTOR(S) : Varun Kumar et al.

It is certified that error appears in the above-identified patent and that said Letters Patent is hereby corrected as shown below:

In the Claims

At Column 2, Claim number 11, Line number 61 please delete “sot” and insert --set--

Signed and Sealed this
Sixteenth Day of July, 2019

Andrei Iancu
*Director of the United States Patent and Trademark Office*